(12) United States Patent
Zhang et al.

(10) Patent No.: US 10,529,377 B2
(45) Date of Patent: Jan. 7, 2020

(54) VIDEO PRESENTATION METHOD, DEVICE, SYSTEM AND STORAGE MEDIUM

(71) Applicant: TENCENT TECHNOLOGY (SHENZHEN) COMPANY LIMITED, Shenzhen, Guangdong (CN)

(72) Inventors: Teng Zhang, Guangdong (CN); Zijun Zhang, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 312 days.

(21) Appl. No.: 14/584,345

(22) Filed: Dec. 29, 2014

(65) Prior Publication Data

US 2015/0110470 A1   Apr. 23, 2015

Related U.S. Application Data

(63) Continuation of application No. PCT/CN2013/077901, filed on Jun. 25, 2013.

(30) Foreign Application Priority Data

Jun. 29, 2012   (CN) .......................... 2012 1 0223370

(51) Int. Cl.
*G11B 27/026* (2006.01)
*G11B 27/00* (2006.01)
(Continued)

(52) U.S. Cl.
CPC .......... *G11B 27/026* (2013.01); *G11B 27/002* (2013.01); *G11B 27/105* (2013.01);
(Continued)

(58) Field of Classification Search
CPC .... H04N 9/8042; H04N 5/85; H04N 7/17318; H04N 21/4622; H04N 21/8586;
(Continued)

(56) References Cited

U.S. PATENT DOCUMENTS

2002/0034980 A1* 3/2002 Lemmons ............... A63F 3/081
    463/40
2003/0182663 A1* 9/2003 Gudorf ................... H04N 7/173
    725/110

(Continued)

FOREIGN PATENT DOCUMENTS

CN   101459900   6/2009
CN   101646050   2/2010
(Continued)

OTHER PUBLICATIONS

International Search Report for PCT/CN2013/077901 dated Oct. 3, 2013.
(Continued)

*Primary Examiner* — Thai Q Tran
*Assistant Examiner* — Syed Y Hasan
(74) *Attorney, Agent, or Firm* — Morgan, Lewis & Bockius LLP (57) ABSTRACT

Disclosed are a video presentation method, device, system and storage medium, which can present video and video comment content at the same time. The method of the present invention comprises: sending a comment presentation request message to a server, the comment presentation request message comprising a first video identifier and a first video play time stamp, so that the server screens comment content directing to a first video corresponding to the first video identifier and using the first video play time stamp as a time start, and generating a first comment content packet; receiving the first comment content packet sent by the
(Continued)

a comment presenting request message is sent to a server — 101 a first comment content package transmitted by the server is received — 102 comment contents related to the first video, which are from the first comment content package, are presented while playing the first video — 103 server; presenting the comment content directing to the first video in the first comment content packet at the same time when playing the first video. The solution provided in an embodiment of the present invention is suitable for being adopted during video presentation.

10 Claims, 4 Drawing Sheets

(51) Int. Cl.
| | |
|---|---|
| *G11B 27/10* | (2006.01) |
| *G11B 27/30* | (2006.01) |
| *H04N 5/85* | (2006.01) |
| *H04N 21/4788* | (2011.01) |
| *H04N 21/254* | (2011.01) |
| *H04N 21/43* | (2011.01) |

(52) U.S. Cl.
CPC ............... *G11B 27/30* (2013.01); *H04N 5/85* (2013.01); *H04N 21/254* (2013.01); *H04N 21/4307* (2013.01); *H04N 21/4788* (2013.01)

(58) Field of Classification Search
CPC ... H04N 21/23406; H04N 2007/17372; H04N 7/17309; H04N 21/20; G11B 27/105; G11B 27/30; G11B 27/34; H04H 60/45; G06F 17/24; G06F 17/3089; A63F 13/12; A63F 13/40; H04L 12/1813

USPC ...... 386/241; 725/109, 110, 10, 93, 16, 114; 715/205, 234, 723; 463/40, 42; 370/260
See application file for complete search history.

(56) References Cited

U.S. PATENT DOCUMENTS

| | | | | |
|---|---|---|---|---|
| 2006/0087987 | A1* | 4/2006 | Witt | ........................ H03M 7/30 |
| | | | | 370/260 |
| 2007/0245243 | A1* | 10/2007 | Lanza | ............... G06F 17/30817 |
| | | | | 715/723 |
| 2008/0119286 | A1* | 5/2008 | Brunstetter | ............. A63F 13/00 |
| | | | | 463/43 |
| 2008/0281592 | A1 | 11/2008 | McKoen et al. | |
| 2009/0158154 | A1 | 6/2009 | Kim | |
| 2011/0231887 | A1* | 9/2011 | West | ...................... G11B 27/34 |
| | | | | 725/116 |
| 2012/0159527 | A1* | 6/2012 | Perez | ............... H04N 21/42203 |
| | | | | 725/10 |

FOREIGN PATENT DOCUMENTS

| | | |
|---|---|---|
| CN | 101854513 | 10/2010 |
| CN | 102342125 A | 2/2012 |

OTHER PUBLICATIONS

Chinese Office Action dated Dec. 14, 2016 in Chinese Application No. 201210223370.2, with partial Engligh translation (14 pages).

* cited by examiner

VIDEO PRESENTATION METHOD, DEVICE, SYSTEM AND STORAGE MEDIUM

CROSS-REFERENCE TO RELATED APPLICATIONS

This application claims priority to and is a continuation application of International Application No. PCT/CN2013/077901 filed on Jun. 25, 2013, which claims priority to Chinese Patent Application No. 201210223370.2, filed on Jun. 29, 2012 by TENCENT TECHNOLOGY (SHENZHEN) CO., LTD. and entitled "VIDEO PRESENTATION METHOD AND DEVICE", the disclosures of which are incorporated herein by reference in their entirety.

TECHNICAL FIELD

The present disclosure relates to the field of communication network technologies, especially to a video presentation method, device and system and storage medium.

TECHNICAL BACKGROUND

In the prior art, video such as a movie, a TV play, a video clip or a live game is presented independently of video comment contents when the video is played, for example, comment contents regarding the video are displayed on a message board below a video page displayed on a user terminal, or press releases of film review are individually played on the user terminal.

Such a manner of presenting video independently of video comment contents is defective. On one aspect, the film reviews played individually lack interaction with audiences; and on another aspect, a user would intend to comment on the watched video content from time to time in watching the video, but there is no convenient way for posting such comments in real time, and most comment points were often forgotten when the user comments on the video after finishing watching the video.

In short, the inventor found out that there are at least following problems in the prior art that: the video and the video comment contents are separate from each other in an existing commenting system, resulting in that comment contents relating to the video cannot be presented in real time.

SUMMARY

Embodiments of the present disclosure provide a video presentation method, device, system and a storage medium, which enable the simultaneous presentation of a video and video comment contents.

Embodiments of the present disclosure adopt following technical schemes.

A video presentation method, which is executable in a user terminal, including:

transmitting to a server a comment presenting request message including a first video identifier and a first video playing time stamp, so that the server filters out comment contents which relate to a first video corresponding to the first video identifier and are issued from the first video playing time stamp, to generate a first comment content package; preferably, the comment presenting request message may further include a user identifier, which is used for identifying a user initiating the comment presenting request message;

receiving the first comment content package transmitted by the server; and presenting the comment contents related to the first video which are from the first comment content package, while playing the first video.

A video presentation method, which is executable in a server, including:

receiving a comment presenting request message transmitted by a user terminal, and obtaining a video identifier and a video playing time stamp in the comment presenting request message;

filtering out, from a stored second comment content package, comment contents which relate to a video corresponding to the video identifier and are issued from the video playing time stamp according to the video identifier, to generate a first comment content package; and transmitting the first comment content package to the user terminal before time represented by the video playing time stamp.

A video presentation device, including:

a transmitting module, which is configured to transmit to a server a comment presenting request message including a first video identifier and a first video playing time stamp, so that the server filters out comment contents which relate to a first video corresponding to the first video identifier and are issued from the first video playing time stamp, to generate a first comment content package; preferably, the comment presenting request message may further include a user identifier, which is used for identifying a user initiating the comment presenting request message;

a receiving module, which is configured to receive the first comment content package transmitted by the server; and a presenting module, which is configured to present the comment contents related to the first video which are from the first comment content package, while playing the first video.

A video presentation device, including:

a receiving module, which is configured to receive a comment presenting request message transmitted by a user terminal, and obtain a video identifier and a video playing time stamp in the comment presenting request message;

a comment filtering module, which is configured to filter out, from a stored second comment content package, comment contents which relate to a video corresponding to the video identifier and are issued from the video playing time stamp, according to the video identifier, to generate a first comment content package; and a transmitting module, which is configured to transmit the first comment content package to the user terminal before time represented by the video playing time stamp.

A video presentation system including a user terminal and a server, where, the user terminal is configured to: transmit to the server a comment presenting request message comprising a video identifier and a video playing time stamp, so that the server filters out comment contents which related to a first video corresponding to the video identifier and are issued from a first video playing time stamp, to generate a first comment content package;

receive the first comment content package transmitted by the server; and present the comment contents related to the first video from the first comment content package, while playing the first video;

the server is configured to: receive the comment presenting request message transmitted by the user terminal, and obtain a video identifier and a video playing time stamp in the comment presenting request message;

filter out, from the stored second comment content package, comment contents which relate to the video corresponding to the video identifier and are issued from the video playing time stamp, according to the video identifier, to generate the first comment content package; and transmit the first comment content package to the user terminal before time represented by the video playing time stamp.

One or more storage media including computer-executable instructions, wherein the computer-executable instructions are configured to execute a video presentation method when executed by a computer processor, and the method includes steps of:

transmitting to a server a comment presenting request message including a first video identifier and a first video playing time stamp, so that the server filters out comment contents which relate to a first video corresponding to the first video identifier and are issued from the first video playing time stamp, so as to generate a first comment content package;

receiving the first comment content package transmitted by the server; and presenting the comment contents related to the first video which are from the first comment content package, while playing the first video.

One or more storage media including computer-executable instructions, wherein the computer-executable instructions are configured to execute a video presentation method when executed by a computer processor, and the method includes steps of:

receiving a comment presenting request message transmitted by a user terminal, and obtaining a video identifier and a video playing time stamp in the comment presenting request message;

filtering out, from the stored second comment content package, comment contents which relate to a video correspond to the video identifier and are issued from the video playing time stamp, so as to generate a first comment content package; and transmitting the first comment content package to the user terminal corresponding to the user identifier before the time represented by the video playing time stamp.

With video presentation method, device, system and the storage medium provided in the embodiments of the present disclosure, the comment presenting request message including the first video identifier, the first video playing time stamp and an optional user identifier to the server, so that the server filters out comment contents which relate to a first video corresponding to the first video identifier and are issued from the first video playing time stamp, so as to generate a first comment content package; the first comment content package transmitted by the server is received; and the comment contents related to the first video which are from the first comment content package are presented while playing the first video. Compared with the existing commenting system in which the video and the video comment contents are separated from each other and hence comment contents relating to the video cannot be presented in real time, the schemes provided by the embodiments of the present disclosure can present the video and the video comment content simultaneously.

DESCRIPTION OF DRAWINGS

To describe technical schemes in the prior art or embodiments of the present disclosure more clearly, accompanying drawings used for describing the embodiments or the prior art will be introduced briefly below. Obviously, the accompanying drawings in the following description illustrate only some embodiments of the present disclosure. Those of ordinary skills in the art may derive other drawings from these accompanying drawings without paying creative work.

DETAILED DESCRIPTION OF THE PREFERRED EMBODIMENT

Technical schemes in embodiments of the present disclosure will be described clearly and completely below by combining the accompanying drawings. Obviously, described embodiments are only part of not all of embodiments of the present disclosure, and are intended to illustrate principles of the present disclosure not to limit the present disclosure to these specific embodiments. Based on the embodiments in the present disclosure, all other embodiments obtained by those of ordinary skills in the art without paying creative work fall within the protection scope of the present disclosure.

First Embodiment

Figure 1:
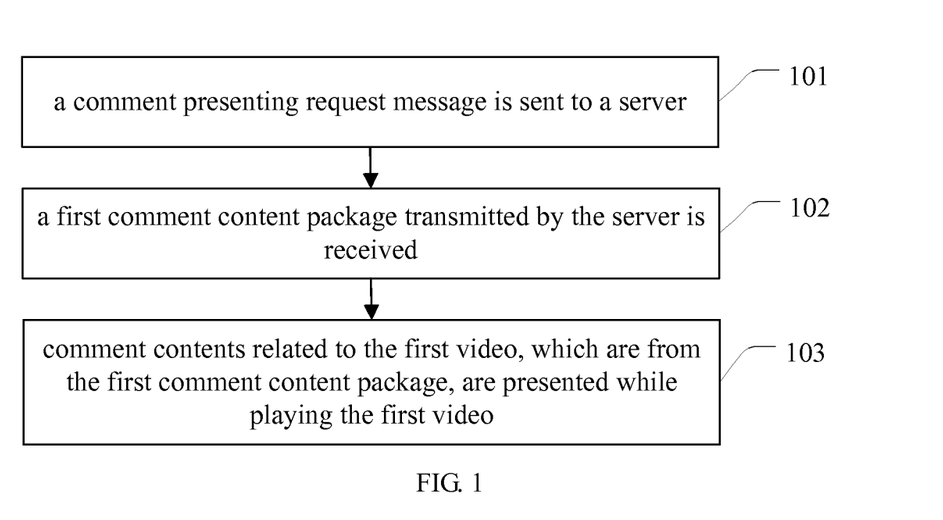
FIG. 1 is a flow chart of a video presentation method provided by a first embodiment of the present disclosure.

An embodiment of the present disclosure provides a video presentation method, which is executable on a user terminal, as shown in FIG. 1, and the method includes following Steps 101, 102 and 103.

At Step 101, a comment presenting request message including a first video identifier and a first video playing time stamp is sent to a server, so that the server filters out comment contents which relate to a first video corresponding to the first video identifier and are issued from the first video playing time stamp, so as to generate a first comment content package. The comment presenting request message may further include a user identifier, which is used for identifying a user initiating the comment presenting request message.

Further, the comment presenting request message may also include a real time commenting threshold value, which is used for indicating the server to filter out comment contents which relate to the first video and are issued within a time period defined by the real time commenting threshold value starting from the first video playing time stamp.

Herein, the real time commenting threshold value represents a real time degree in receiving comments by the user terminal. For example, if the real time commenting threshold value defines a time period of 5 seconds, the user terminal transmits a request for obtaining comments once every 5 seconds in playing the video, so that various comment content packages to be presented within subsequent 5 seconds can be obtained from the server. For example, if the first video playing time stamp is 10 seconds, and the real time commenting threshold value defines a time period of 5 seconds, then the server filters out comment contents related to the corresponding video content that are issued during a period from the $10^{th}$ second to the $15^{th}$ second, and transmits the filtered out comment contents to the user terminal. Of course, to save network traffic, it is possible to employ such a way that the first comment content package is transmitted automatically by the server. Namely, the server filters out comment contents which relate to the first video and are issued within a time period defined by the real time commenting threshold value starting from the first video playing time stamp, after the real time commenting threshold value is provided to the server by the user terminal, so as to generate and transmit a first comment content package; moreover, by taking the time period defined by the real time commenting threshold value as a cycle, the server automatically and continuously transmits comment contents which relate to the first video and are issued within each subsequent time period defined by the real time commenting threshold value, so as to generate and transmit a first comment content package.

Further, before Step 101, the method further includes: generating a second comment content package according to comment data received from the user for example, and transmitting the second comment content package to the server for processing, so as to issue comment contents in the second comment content package.

The user terminal receives comment data generated from the user input, where the comment data includes a text comment, a video comment or an audio comment on a second video. Here, the second video may be any video watched and commented by the user. The user can input a video comment through a camera of the user terminal or other video capturing devices, and the user can input an audio comment through a microphone of the user terminal or other audio capturing devices.

Further, if the received comment data is a video comment or an audio comment made on the second video, a text comment is generated from the received comment data by voice recognition; and then the second comment content package is generated from the generated text comment, the video comment or audio comment, a video playing time stamp of the second video, a video identifier of the second video, and a user identifier corresponding to the generated text comment; or if the received comment data is a text comment, the second comment content package is generated from the received text comment, a video playing time stamp of the second video, a video identifier of the second video, and a user identifier corresponding to the received text comment.

It should be noted that, in the embodiment, the second comment content package is to be transmitted to the server for further processing such as verifying, storing and filtering.

In this step, the first video may be such a video that the user expects to review comment contents related to the video. It should be noted that the first video may be the same as or different from the second video.

At Step 102, the first comment content package transmitted by the server is received.

At Step 103, the comment contents related to the first video, which are from the first comment content package, are presented while playing the first video.

Further, it is possible to present the comment contents related to the first video, which are from the first comment content package and within a time period defined by the real time commenting threshold value, while playing the first video.

The first comment content package may include other users' comment contents related to the first video. When the first video is the same as the second video, the first comment content package may further include comment contents issued by the current user to the video.

With the video presentation method provided in the embodiment of the present disclosure, the comment presenting request message including the first video identifier, the first video playing time stamp and an optional user identifier to the server, so that the server filters out comment contents which relate to a first video corresponding to the first video identifier and are issued from the first video playing time stamp, so as to generate a first comment content package; the first comment content package transmitted by the server is received; and the comment contents related to the first video which are from the first comment content package are presented while playing the first video. Therefore, with the scheme provided by the embodiment of the present disclosure, the video and the video comment contents can be presented simultaneously.

Figure 2:
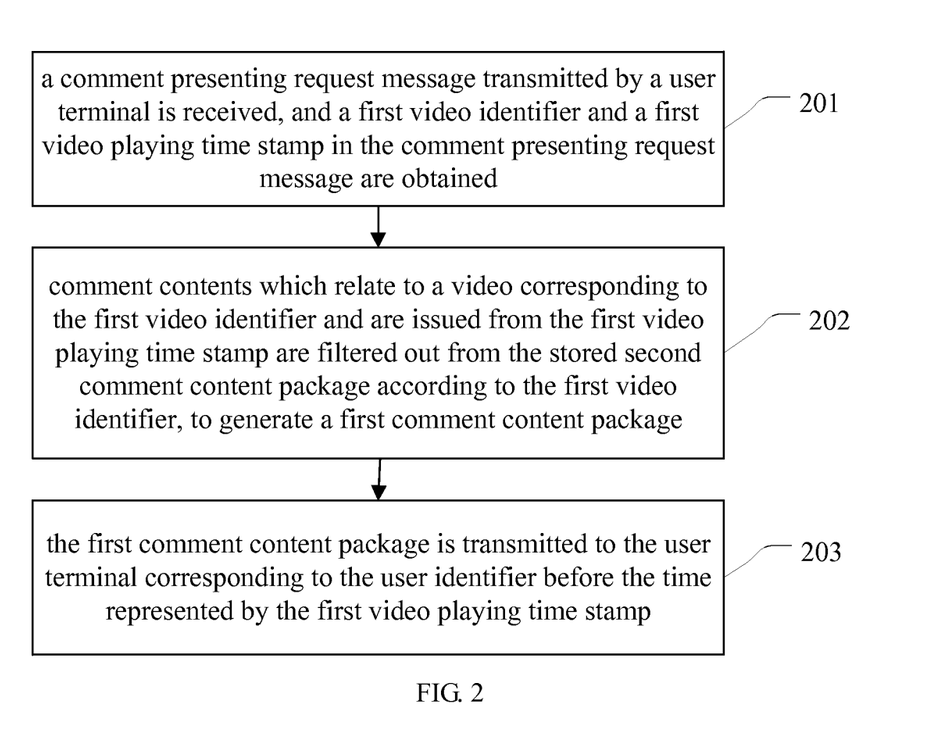
FIG. 2 is a flow chart of another video presentation method provided by the first embodiment of the present disclosure.

An embodiment of the present disclosure provide another video presentation method, which is executable on a server, as shown in FIG. 2, and the method includes the following Steps 201, 202 and 203.

At Step 201, a comment presenting request message transmitted by a user terminal is received, and a first video identifier and a first video playing time stamp in the comment presenting request message are obtained.

In addition, a user identifier, which is used for identifying a user initiating the comment presenting request message, can also be obtained from the received comment presenting request message.

Further, after receiving the comment presenting request message transmitted by the user terminal, the method further includes: obtaining a real time commenting threshold value in the comment presenting request message.

The real time commenting threshold value represents a real time degree in receiving comments by the user terminal. For example, if the real time commenting threshold value defines a time period of 5 seconds, the user terminal transmits a request for obtaining comments once every 5 seconds in playing the video, so that various comment content packages to be presented within subsequent 5 seconds can be obtained from the server. Of course, to save network traffic, it is also possible to employ the above-mentioned way that the first comment content package is transmitted automatically by the server.

Before this step, the method may further include: receiving and storing a second comment content package transmitted by at least one user terminal. The second comment content package includes comment data transmitted from the at least one user terminal, and the comment data includes: a text comment, a video comment or an audio comment related to a second video.

It should be noted that the first video may be such a video that the user transmitting the comment presenting request message expects to review video comment contents related to the video, the second video may be any video watched and commented by the user, and the first video may be the same as or different from the second video.

At Step 202, comment contents which relate to a video corresponding to the first video identifier and are issued from the first video playing time stamp are filtered out from the stored second comment content package according to the first video identifier, so as to generate a first comment content package.

Here, information focused by the user can also be considered when generating the first comment content package. For example, the information focused by the user is obtained according to the user identifier, and comment contents which relate to the video corresponding to the video identifier and are issued from the video playing time stamp are filtered out from the stored second comment content package according to the information focused by the user and the video identifier, so as to generate the first comment content package.

It should be noted that, in the embodiment, the second comment content package is to be transmitted to the server for further processing such as verifying, storing and filtering. The first comment content package is a comment content package generated from filtering and organizing by the server according to the received second comment content package and a filtering condition.

Further, the manner of generating the first comment content package in this step may include:

generating different comment packages from the second comment content package and storing the generated comment packages, where the comment packages include comment contents such as at least one complete video comment content, and may be of different types;

obtaining information focused by the user according to the user identifier, and generating focused comment contents according to the information focused by the user and comment contents in the generated comment packages, where the information focused by the user includes a video or other users focused on by the user; and filtering out, from the focused comment contents according to the first video identifier, first comment contents related to the video corresponding to the first video identifier; and filtering out, from the first comment contents, comment contents which are issued from the first video playing time stamp, so as to generate the first comment content package.

At Step 203, the first comment content package is transmitted to the user terminal corresponding to the user identifier before the time represented by the first video playing time stamp, where the comment presenting request message is transmitted from the user terminal After receiving the comment presenting request message transmitted by the user terminal, the method further includes: obtaining a real time commenting threshold value in the comment presenting request message; and filtering out, from the first comment contents, comment contents which are issued within a time period defined by the real time commenting threshold value starting from the first video playing time stamp, so as to generate the first comment content package.

With the video presentation method provided in the embodiment of the present disclosure, a comment presenting request message transmitted by a user terminal is received, and a first video identifier and a first video playing time stamp in the comment presenting request message are obtained; comment contents which relate to a video corresponding to the first video identifier and are issued from the first video playing time stamp are filtered out from the stored second comment content package according to the first video identifier, so as to generate a first comment content package; and the first comment content package is transmitted to the user terminal before the time represented by the first video playing time stamp. Therefore, in the embodiment of the present disclosure, corresponding first comment contents are filtered out according to the comment presenting request message of the user, to generate and transmit the first comment content package, so that the video and the video comment contents can be presented simultaneously.

Second Embodiment

Figure 3:
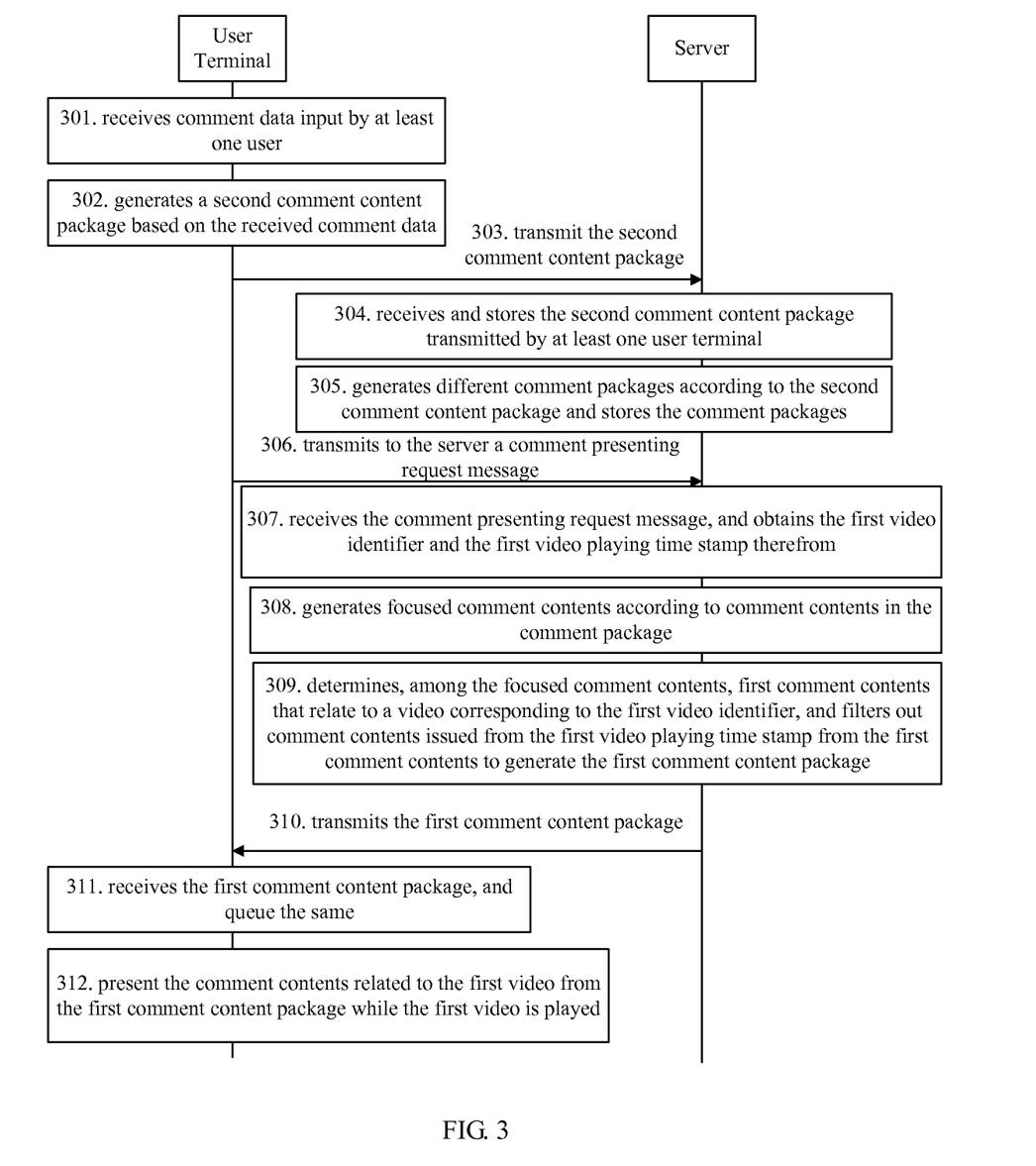
FIG. 3 is a flow chart of a video presentation method provided by a second embodiment of the present disclosure.

An embodiment of the present disclosure provide a video presentation method, as shown in FIG. 3, and the method includes following Steps 301 to 312.

At Step 301, a user terminal receives comment data input by at least one user.

The comment data may include a text comment, a video comment or an audio comment related to a second video. It should be noted that the second video herein may be any video watched and commented by the user, and the word "second" is used for distinguishing from other videos not for sorting. Comment contents can be input by the user whenever the user has emotional catharsis and impulsion to comment on the second video in watching the second video. The user can input a video comment through a camera of the user terminal or other video capturing devices, or input an audio comment through a microphone of the user terminal or other audio capturing devices.

At Step 302, the user terminal generates a second comment content package based on the received comment data.

The comment data may be divided in the present step into two types, i.e. a text comment, and a video comment and audio comment type. If the received comment data is a video comment or an audio comment made on the second video, a text comment is generated from the received comment data by voice recognition; and then the second comment content package is generated from the generated text comment, the video comment or audio comment, a video playing time stamp of the second video, a video identifier of the second video, and a user identifier corresponding to the generated text comment; or if the received comment data is a text comment, the second comment content package is generated from the received text comment, a video playing time stamp of the second video, a video identifier of the second video, and a user identifier corresponding to the received text comment.

It should be noted that, in the embodiment, the second comment content package is to be transmitted to a server for further processing such as verifying, storing and filtering.

At Step 303, the second comment content package is transmitted from the user terminal to the server for processing, so as to obtain issued comment contents, namely, comment contents in the second comment content package are issued.

At Step 304, the server receives and stores the second comment content package transmitted by at least one user terminal.

Specifically, a comment managing module in the server receives and stores second comment content packages transmitted by various user terminals. To filter out proper comment contents according to a comment presenting request message from the user, a comment filtering module obtains corresponding part of the second comment content packages from the comment managing module, and further filters the obtained second comment content packages.

At Step 305, the server generates different comment packages according to the second comment content package and stores the comment packages.

The comment package includes comment contents, for example, at least one complete video comment content. A comment package may include one or more complete video comment contents such as a complete commentary carried out for a certain ball game. The comment packages may be of different types, for example, a comment package may include various comments on a certain video, or include a comment collection related to many videos. The comment collection may be in a humor or solemnity style. These comment packages may be focused on by the user as individual objects.

Optionally, the comment package may be stored in the comment managing module for further processing.

Further, a user communication background in the server receives operation data from a user communication foreground, organizes the operation data and corresponding data in the comment package, and returns organized data to the user communication foreground to present. The organized data may include comments issued by the user.

At Step 306, the user terminal transmits a comment presenting request message including a first video identifier and a first video playing time stamp to the server, so that the server filters out comment contents which relate to a first video corresponding to the first video identifier and are issued from the first video playing time stamp, so as to generate a first comment content package. The comment presenting request message here may further include a user identifier, which is used for identifying a user initiating the comment presenting request message.

The first video may be such a video that the user transmitting the comment presenting request message expects to review video comment contents related to the video, and the term "first" in the wording "first video" is used for distinguishing from other videos not for sorting. The first video may be the same as or different from the second video.

Further, the comment presenting request message may also include a real time commenting threshold value, which is used for indicating the server to filter out comment contents which relate to the first video corresponding to the first video identifier and are issued within a time period defined by the real time commenting threshold value starting from the first video playing time stamp.

Herein, the real time commenting threshold value represents a real time degree in receiving comments by the user terminal. For example, if the real time commenting threshold value defines a time period of 5 seconds, the user terminal transmits a request for obtaining comments once every 5 seconds in playing the video, so that various comment content packages to be presented within subsequent 5 seconds can be obtained from the server.

For example, if the user expects to review comments at a time stamp of the $10^{th}$ second in the first video, then the first video playing time stamp is set as 10 seconds, and the real time commenting threshold value is set as 5 seconds, then comment contents related to the first video during a period from the $10^{th}$ second to the $15^{th}$ second in the first video will be filtered out by the server, which then transmits the comment contents filtered out to a corresponding user terminal according to the user identifier, where the user terminal is the one transmitting the comment presenting request message.

Of course, to save network traffic, it is also possible to employ the above-mentioned way that the first comment content package is transmitted automatically by the server.

At Step 307, the server receives the comment presenting request message transmitted by the user terminal, and obtains the first video identifier, the first video playing time stamp and an optional user identifier from the comment presenting request message.

Further, after receiving the comment presenting request message transmitted by the user terminal, the method further includes: obtaining a real time commenting threshold value in the comment presenting request message.

At Step 308, the server generates focused comment contents according to comment contents in the comment package; preferably, the server obtains information focused by the user according to the user identifier, and generates the focused comment contents according to the information focused by the user and the comment contents in the comment package.

The information focused by the user may include a video or other users focused on by the user. Optionally, the user may focus on favorite videos on a personal homepage of the user, or focus on other users familiar to or interested, so that videos or other users being focused on will be presented in the user's personal homepage, and all comment contents relating to the videos can also be browsed in a webpage presenting the videos. The server may obtain the information focused by the user through interacting with the user terminal and stores the information focused by the user.

Further, the user communication background in the server receives operation data from the user communication foreground, organizes the operation data and corresponding data in the comment package, and returns organized data to the user communication foreground to present. Meanwhile, the user communication background in the server filters out comment contents regarding a video focused on by the user or comment contents issued by other users from the comment package according to the information focused by the user, to generate the focused comment contents.

At Step 309, the server determines, among the focused comment contents, first comment contents that relate to a video corresponding to the first video identifier, and filters out comment contents issued from the first video playing time stamp from the first comment contents, to generate the first comment content package.

Further, it is possible to determine the first video according to the first video identifier, filter out corresponding comment contents related to the first video from the focused comment contents as the first comment contents, and filter out, from the first comment contents, comment contents issued within a time period defined by the real time commenting threshold value starting from the first video playing time stamp, so as to generate the first comment content package.

The first comment content package may include other users' comment contents related to the first video, and may further include comment contents issued by the current user to the first video.

At Step 310, the server transmits the first comment content package to a user terminal corresponding to the user identifier before the time represented by the first video playing time stamp, where the comment presenting request message is transmitted from this user terminal.

At Step 311, the user terminal receives the first comment content package transmitted by the server.

Further, the user terminal sorts the videos or comment contents to be presented in a temporal order, for example, in the order of the corresponding video playing time stamps.

At Step 312, the comment contents related to the first video from the first comment content package are presented while the first video is played.

Further, it is possible to present the comment contents related to the first video from the first comment content package that are issued within a time period defined by the real time commenting threshold value, while the first video is played.

Further, the first video and comment contents related to the first video may be presented in a page of the user communication foreground. The page of the user communication foreground may include a video comment homepage and a user's personal homepage, the video comment homepage is used for displaying all comment contents relating to a video, and the user's personal homepage is used for displaying comment contents which are issued by the user with respect to various videos.

With the video presentation method provided in the embodiment of the present disclosure, a comment presenting request message is transmitted to a server, so that the server filters out comment contents which relate to the first video corresponding to the first video identifier and are issued within a time period defined by the real time commenting threshold value starting from the first video playing time stamp; the first comment content package transmitted by the server is received; and the comment contents related to the first video from the first comment content package that are issued within a time period defined by the real time commenting threshold value are presented while the first video is played. With such scheme provided by the embodiment of the present disclosure, the video and the video comment contents can be presented simultaneously, resulting in a better real time performance.

Third Embodiment

Figure 4:
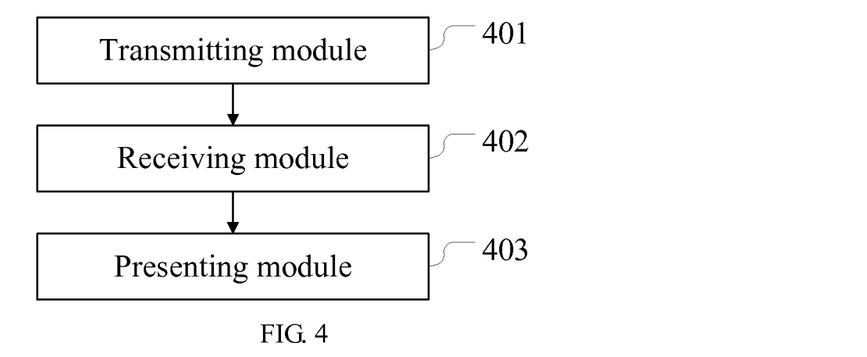
FIG. 4 is a block diagram of a video presentation device on the side of a user terminal provided by a third embodiment of the present disclosure.

An embodiment of the present disclosure provides a video presentation device which may be a user terminal, as shown in FIG. 4, and the device includes: a transmitting module 401, a receiving module 402, and a presenting module 403.

The transmitting module 401 is configured to transmit to a server a comment presenting request message including a first video identifier and a first video playing time stamp, so that the server filters out comment contents which relate a first video corresponding to the first video identifier and are issued from the first video playing time stamp, so as to generate a first comment content package; preferably, the comment presenting request message further includes a user identifier, which is used for identifying a user initiating the comment presenting request message.

Further, the comment presenting request message may also include a real time commenting threshold value, which is used for indicating the server to filter out comment contents which relate to the first video corresponding to the first video identifier and are issued within a time period defined by the real time commenting threshold value starting from the first video playing time stamp.

The real time commenting threshold value represents a real time degree in receiving comments by the user terminal. For example, if the real time commenting threshold value defines a time period of 5 seconds, the user terminal transmits a request for obtaining comments once every 5 seconds in playing the video, so that various comment content packages to be presented within subsequent 5 seconds can be obtained from the server. Of course, to save network traffic, it is also possible to employ the above-mentioned way that the first comment content package is transmitted automatically by the server.

The first video may be such a video that the user transmitting the comment presenting request message expects to review video comment contents related to the video.

The receiving module 402 is configured to receive the first comment content package transmitted by the server.

The presenting module 403 is configured to present the comment contents related to the first video which are from the first comment content package, while the first video is played.

Further, the presenting module 403 may be configured to present the comment contents related to the first video, which are from the first comment content package and within a time period defined by the real time commenting threshold value, while the first video is played.

The first comment content package may include other users' comment contents related to the first video. When the first video is the same as the second video, the first comment content package may further include comment contents issued by the current user to the video.

Further, the first video and comment contents related to the first video may be presented in a page of the user communication foreground. The page of the user communication foreground may include a video comment homepage and a user's personal homepage, the video comment homepage is used for displaying all comment contents relating to a video, and the user's personal homepage is used for displaying comment contents which are issued by the user with respect to various videos.

Figure 5:
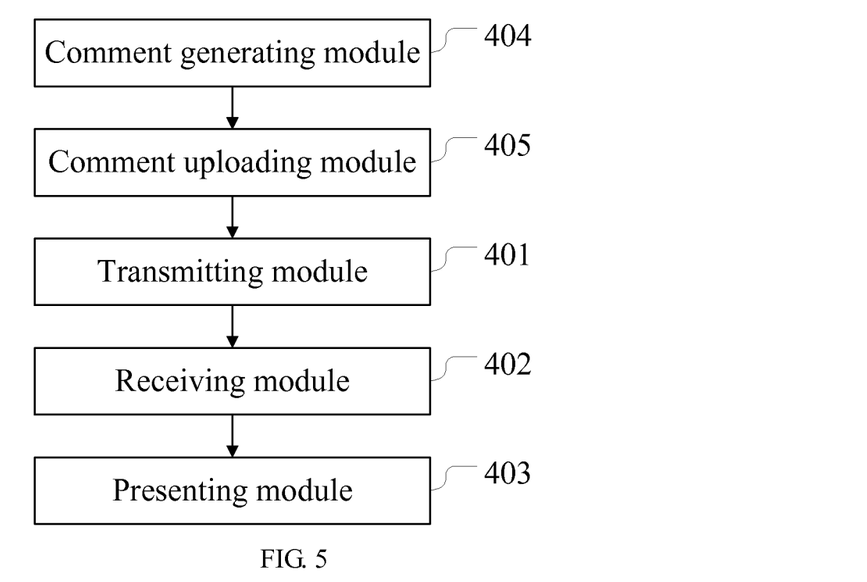
FIG. 5 is a block diagram of another video presentation device on the side of the user terminal provided by the third embodiment of the present disclosure.

Further, as shown in FIG. 5, the device may further include: a comment generating module 404 and a comment uploading module 405.

The comment generating module 404 is configured to generate a second comment content package from received comment data, which includes a text comment, a video comment or an audio comment related to a second video.

The comment uploading module 405 is configured to transmit the second comment content package to the server for processing, so as to obtain issued comment contents (namely, to issue the comment contents in the second comment content package) and the first comment content package to be presented.

Further, the comment generating module 404 is configured to: generate a text comment by voice recognition if the received comment data is a video comment or an audio comment made on the second video, and generate the second comment content package from the generated text comment, the video comment or audio comment, a video playing time stamp of the second video, a video identifier of the second video, and a user identifier corresponding to the generated text comment; or, generate the second comment content package from the received text comment, a video playing time stamp of the second video, a video identifier of the second video, and a user identifier corresponding to the received text comment if the received comment data is a text comment.

It should be noted that the second video may be any video watched and commented by the user, and the first video may be the same as or different from the second video.

In the embodiment, the second comment content package is to be transmitted to the server for further processing such as verifying, storing and filtering. The first comment content package is a comment content package generated from filtering and organizing by the server according to the received second comment content package and a filtering condition.

With the use of the video presentation device in the embodiment of the present disclosure, a comment presenting request message is transmitted to a server by the transmitting module, so that the server filters out comment contents which relate to a first video corresponding to the first video identifier and are issued from the first video playing time stamp, so as to generate a first comment content package; the first comment content package transmitted by the server is received by the receiving module; and the comment contents related to the first video which are from the first comment content package are presented by the presenting module while the first video is played. Therefore, with the scheme provided by embodiments of the present disclosure, the video and the video comment contents can be presented simultaneously.

Figure 6:
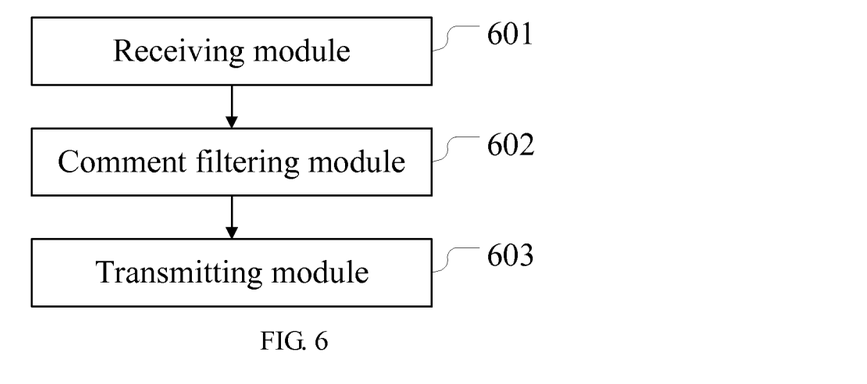
FIG. 6 is a block diagram of a video presentation device on the side of a server provided by the third embodiment of the present disclosure.

An embodiment of the present disclosure provides a video presentation device which may be a server, as shown in FIG. 6, and the device includes: a receiving module 601, a comment filtering module 602 and a transmitting module 603.

The receiving module 601 is configured to receive a comment presenting request message transmitted by a user terminal, and obtain a first video identifier and a first video playing time stamp in the comment presenting request message; preferably, the comment presenting request message further includes a user identifier, which is used for identifying a user initiating the comment presenting request message; moreover, the receiving module 601 is further configured to obtain the user identifier.

The first video identifier and the first video playing time stamp included in the comment presenting request message are used by the server to filter out comment contents related to the first video before the first video is played, then the comment contents filtered out are transmitted to the corresponding user terminal according to the user identifier, where the comment presenting request message is transmitted from this user terminal. The first video is such a video that the user transmitting the comment presenting request message expects to review video comment contents issued on the video.

Further, the receiving module 601 is further configured to obtain a real time commenting threshold value from the comment presenting request message. The real time commenting threshold value represents a real time degree in receiving comments by the user terminal. For example, if the real time commenting threshold value defines a time period of 5 seconds, the user terminal transmits a request for obtaining comments once every 5 seconds in playing the video, so that various comment content packages to be presented within subsequent 5 seconds can be obtained from the server. Of course, to save network traffic, it is also possible to employ the above-mentioned way that the first comment content package is transmitted automatically by the server.

The comment filtering module 602 is configured to filter out, from the stored second comment content package, comment contents which relate to a first video corresponding to the first video identifier and are issued from the first video playing time stamp according to the first video identifier, so as to generate a first comment content package; preferably, the comment filtering module 602 is further configured to obtain information focused by the user according to the user identifier, and filter out, from the stored second comment content package, comment contents which relate to the video corresponding to the video identifier and are issued from the video playing time stamp according to the information focused by the user and the first video identifier, so as to generate the first comment content package;

The transmitting module 603 is configured to transmit the first comment content package to a user terminal corresponding to the user identifier before the time represented by the first video playing time stamp, where the comment presenting request message is transmitted from this user terminal.

Figure 7:
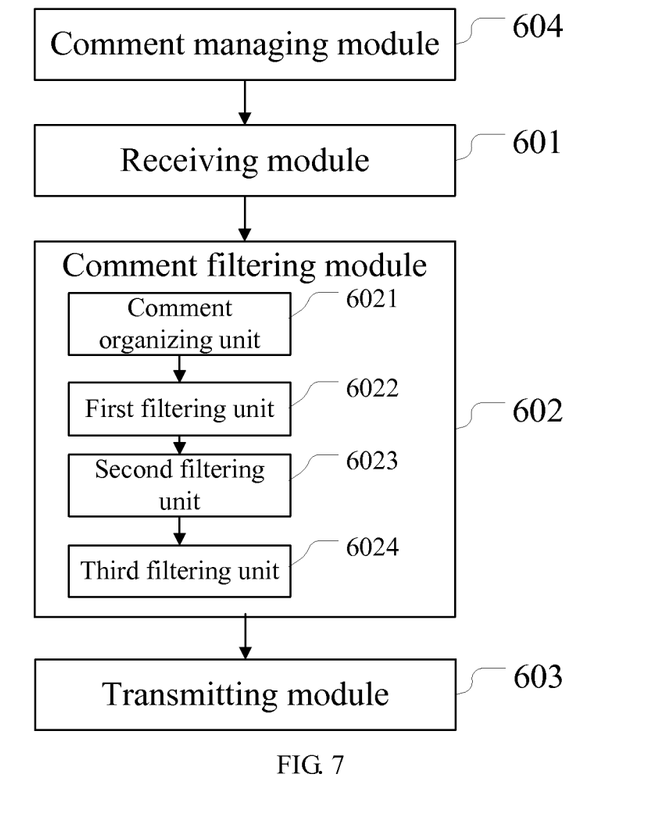
FIG. 7 is a block diagram of another video presentation device on the side of the server provided by the third embodiment of the present disclosure.

Further, as shown in FIG. 7, the device further includes a comment managing module 604.

The comment managing module 604 is configured to receive and store a second comment content package transmitted by at least one user terminal, and such reception and storage may be performed before the receiving module 601 receives a comment presenting request message transmitted by the user terminal. The second comment content package may include comment data transmitted from various users, and the comment data include: a text comment, a video comment or an audio comment made on a second video.

Further, as shown in FIG. 7, the comment filtering module 602 includes: a comment organizing unit 6021, a first filtering unit 6022, a second filtering unit 6023 and a third filtering unit 6024.

The comment organizing unit 6021 is configured to generate different comment packages according to the second comment content package and store the comment packages. The comment package includes comment contents, for example, at least one complete video comment content; moreover, the comment packages may be of different types, for example, a comment package may include a complete commentary carried out for a certain ball game, various comments on a certain video, or include a comment collection related to many videos. The comment collection may be in a humor or solemnity style. These comment packages may be focused on by the user as individual objects.

The first filtering unit 6022 is configured to obtain information focused by the user according to the user identifier, and generate focused comment contents according to the information focused by the user and comment contents in the comment package, where the information focused by the user includes a video or other users focused on by the user.

The second filtering unit 6023 is configured to determine, from the focused comment contents, first comment contents related to the video corresponding to the first video identifier.

The third filtering unit 6024 is configured to filter out, from first comment contents, comment contents which are issued from the first video playing time stamp, to generate the first comment content package.

If the receiving module 601 further obtains a real time commenting threshold value from the comment presenting request message, the third filtering unit 6024 filters out, from the first comment contents, comment contents issued within a time period defined by the real time commenting threshold value starting from the first video playing time stamp, so as to generate the first comment content package.

It should be noted that, in the embodiment, the second comment content package is to be transmitted to the server for further processing such as verifying, storing and filtering. The first comment content package is a comment content package generated from filtering and organizing by the server according to the received second comment content package and a filtering condition.

With the use of the video presentation device in the embodiment of the present disclosure, a comment presenting request message transmitted by a user terminal is received by the receiving module, and a first video identifier and a first video playing time stamp in the comment presenting request message are obtained; the comment filtering module filters out, from the stored second comment second comment content package, comment contents which relate to a video corresponding to the video identifier and are issued from the first video playing time stamp according to the first video identifier, so as to generate a first comment content package; and the transmitting module transmits the first comment content package to the user terminal before the time represented by the first video playing time stamp. Therefore, in the embodiment of the present disclosure, the corresponding first comment content package is filtered our according to the comment presenting request message from the user, thus the video and video comment contents can be presented simultaneously.

Fourth Embodiment

Figure 8:
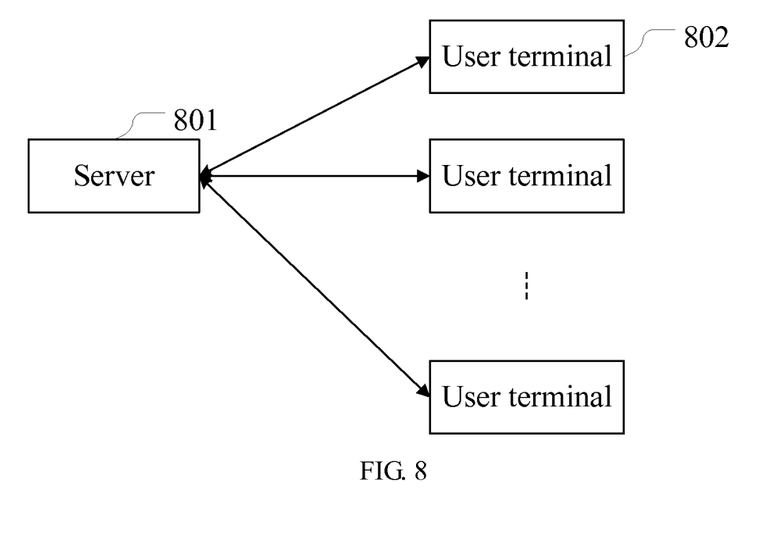
FIG. 8 is a schematic diagram of a video presentation system provided by a fourth embodiment of the present disclosure.

An embodiment of the present disclosure provides a video presentation system, as shown in FIG. 8, and the system includes at least a user terminal 801 and a server 802.

The user terminal 801 is configured to transmit to the server 802 a comment presenting request message including a video identifier and a video playing time stamp, so that the server filters out comment content which relate to a first video corresponding to the video identifier and are issued from the video playing time stamp, so as to generate a first comment content package; preferably, the comment presenting request message further includes a user identifier, which is used for identifying a user initiating the comment presenting request message. The user terminal 801 is further configured to receive the first comment content package transmitted by the server 802; and present the comment contents related to the first video from the first comment content package, while the first video is played.

Further, the comment presenting request message may also include a real time commenting threshold value.

The real time commenting threshold value is used for indicating the server to filter out comment contents which relate to the first video corresponding to the first video identifier and are issued within a time period defined by the real time commenting threshold value starting from the video playing time stamp.

The server 802 is configured to: receive the comment presenting request message transmitted by the user terminal 801, and obtain a video identifier and a video playing time stamp in the comment presenting request message; and and filter out, from the stored second comment content package, comment contents which relate to the video corresponding to the video identifier and are issued from the video playing time stamp, according to the video identifier, so as to generate the first comment content package.

Preferably, the server 802 further obtains the user identifier from the received comment presenting request message, obtains information focused by the user according to the user identifier, and filters out, from the stored second comment content package, comment contents which relate to the video corresponding to the video identifier and are issued from the video playing time stamp, according to the information focused by the user and the video identifier, so as to generate the first comment content package.

The first comment content package is transmitted to the user terminal 801 corresponding to the user identifier before the time represented by the video playing time stamp, where the comment presenting request message is transmitted from this user terminal 801.

Further, the user terminal 801 generates the second comment content package from received comment data, and transmits the second comment content package to the server 802 for processing, so as to obtain issued comment contents, namely, to issue comment contents in the second comment content package.

Herein, the comment data may include: a text comment, a video comment or an audio comment on a second video. When receiving comment data which is a video comment or audio comment on the second video, the user terminal 801 generates a text comment by voice recognition; and generates the second comment content package according to the generated text comment, the video comment or audio comment, a video playing time stamp of the second video, a video identifier of the second video, and a user identifier corresponding to the generated text comment; or when receiving comment data which is a text comment, the user terminal 801 generates the second comment content package according to the received text comment, a video playing time stamp of the second video, a video identifier of the second video, and a user identifier corresponding to the received text comment.

Further, the server 802 receives and stores a second comment content package transmitted by at least one user terminal before the server 802 receives a comment presenting request message transmitted by the user terminal.

Further, after receiving the comment presenting request message transmitted by the user terminal, the server 802 further: obtains the real time commenting threshold value in the comment presenting request message, obtains information focused by the user according to the user identifier, and filters out, from the stored second comment content package, comment contents issued within a time period defined by the real time commenting threshold value starting from the video playing time stamp, according to the information focused by the user and the video identifier, so as to generate the first comment content package.

Further, the server 802 filters the comment contents stored in the second comment content package so as to generate the first comment content package, particularly by: generating different comment packages according to the second comment content package and storing the comment packages; obtaining information focused by the user according to the user identifier, and generating focused comment contents according to the information focused by the user and comment contents in the comment packages; determining, from the focused comment contents, first comment contents related to a video corresponding to the first video identifier; and filtering out, from the first comment contents, comment contents issued within a time period defined by the real time commenting threshold value starting from the video playing time stamp, so as to generate the first comment content package.

Herein, the comment package includes at least one complete video comment content, and the comment packages may be of different types. The information focused by the user includes a video or other users focused on by the user.

The user terminal may be the video presentation device shown in FIG. 4 or FIG. 5, and the server may be the video presentation device shown in FIG. 6 or FIG. 7.

In the video presentation system provided in the embodiment of the present disclosure, comment contents stored in the second comment content package are filtered by the server according to the comment presenting request message transmitted from the user terminal, so as to generate a first comment content package; a first comment content package matching conditions is sent to the user terminal; and the user terminal presents the comment contents related to the first video from the first comment content package while playing the first video. Therefore, with the scheme provided by the embodiment of the present disclosure, the video and the video comment contents can be presented simultaneously.

An embodiment of the present disclosure provides one or more storage media including computer-executable instructions, and the computer-executable instructions are configured to execute a video presentation method when executed by a computer processor, where the method includes following steps of:

transmitting to a server a comment presenting request message including a first video identifier and a first video playing time stamp, so that the server filters out comment contents which relate to a first video corresponding to the first video identifier and are issued from the first video playing time stamp, so as to generate a first comment content package;

receiving the first comment content package transmitted by the server; and presenting the comment contents related to the first video which are from the first comment content package, while playing the first video.

An embodiment of the present disclosure provides one or more storage media including computer-executable instructions, and the computer-executable instructions are configured to execute a video presentation method when executed by a computer processor, where the method includes following steps of:

receiving a comment presenting request message transmitted by a user terminal, and obtaining a video identifier and a video playing time stamp in the comment presenting request message;

filtering out, from the stored second comment content package, comment contents which relate to a video correspond to the video identifier and are issued from the video playing time stamp, so as to generate a first comment content package; and transmitting the first comment content package to the user terminal corresponding to the user identifier before the time represented by the video playing time stamp.

Through the above description of the embodiments, those skilled in the art can understand clearly that the present disclosure can be implemented by software and necessary general hardware; of course, the present disclosure can also be implemented only by hardware. In view of such understanding, the substance of the technical scheme of the present disclosure or parts of the present disclosure contributing to the prior art may be embodied in form of a computer software product, and the computer software product may be stored in a computer readable storage medium, such as a floppy disk, a Read-Only Memory (ROM), a Random Access Memory (RAM), a FLASH, a hard disk or an optical disc of a computer, and contain some instructions to cause a computer device (which may be a personal computer, a server, a network device or the like) to execute methods mentioned in the various embodiments of the present disclosure.

Some specific embodiments of the present disclosure have been described as above, but the protection scope of the present disclosure is not limited thereto. Any modification or substitution readily occurs to those skilled in the art without departing from the technical scope disclosed by the present disclosure shall fall within the protection scope of the present disclosure. Therefore, the protection scope of the present disclosure should be subject to the protection scope of claims.

The invention claimed is:

1. A video presentation method, which is executable on a user terminal, comprising:
    displaying a first live video watched by a user on the user terminal,
    while displaying the first live video in real time:
        receiving comment content from the user on the first live video;
        transmitting, by the user from the user terminal, to a server a first comment retrieving request message for retrieving comment content issued in real time with the first live video that is being watched by the user on the user terminal, the first comment retrieving request message including a user identifier, a first video identifier of the first live video, a first video playing time stamp, and the comment content received from the user of the user terminal while watching the first live video, so that the server identifies (1) comment content issued in real time with the first live video corresponding to the first video identifier, (2) comment content starting from a time point indicated by the first video playing time stamp, and (3) a plurality of other users followed by the user based on the user identifier;
            wherein the server generates, from the identified comment content, a plurality of comment packages that are organized by: (i) comment data on the first live video that is issued by the other users followed by the user; (ii) comment data on other videos related to the first live video and issued by the other users followed by the user; and (iii) comment data on the first live video categorized by different styles;
        receiving a user selection from the plurality of comment content packages and transmitting the user selection to the server;
        receiving the user-selected comment content package from the server; and
        presenting comment content issued in real time with the first live video from the user selected first comment content package in real time;
    wherein the first comment retrieving request message further comprises a real time commenting threshold value, wherein the server generates the first comment content package by including the comment content issued in real time with the first live video and issued within a time period defined by the real time commenting threshold value starting from the time point indicated by the first video playing time stamp into the first comment content package.

2. The video presentation method according to claim 1, wherein, the user identifier is used for identifying the user initiating the first comment retrieving request message.

3. The video presentation method according to claim 1, further comprising:
    generating a second comment content package based on comment data received from the user while watching a second video on the user terminal; and
    transmitting the second comment content package to the server, to issue comment content in the second comment content package.

4. The video presentation method according to claim 3, wherein, generating the second comment content package comprises:

if the comment data received from the user includes a video comment or an audio comment related to the second video,
  generating a text comment based on the video comment or the audio comment by voice recognition; and
  generating the second comment content package according to the generated text comment, the video comment or the audio comment, a second video playing time stamp of the second video, a second video identifier of the second video, and a user identifier corresponding to the generated text comment; or
if the comment data received from the user includes text comment,
  generating the second comment content package according to the received text comment, a second video playing time stamp of the second video, a second video identifier of the second video, and a user identifier corresponding to the received text comments.

5. The video presentation method according to claim 1, further comprising:
  without sending additional comment retrieving request messages, automatically and periodically receiving the comment content related to the first live video issued within each subsequent time period defined by the real time commenting threshold value.

6. The video presentation method according to claim 1, further comprising:
  periodically transmitting a plurality of comment retrieving request messages subsequent to the first comment retrieving request message to receive the comment content related to the first live video issued within each subsequent time period defined by the real time commenting threshold value.

7. A video presentation method, which is executable in a server, comprising:
  receiving a first comment retrieving request message from a user while watching a first live video on a user terminal, and obtaining a user identifier, a first video identifier of the first live video, comment content received from the user of the user terminal while watching the first live video, a first video playing time stamp and a first real time commenting threshold value from the first comment presenting request message;
  identifying (1) comment content issued in real time with the first live video corresponding to the first video identifier, (2) comment content starting from a time point indicated by the first video playing time stamp and within a time period defined by the first real time commenting threshold value
  generating, from the identified comment content, a plurality of comment packages that are organized by: (i) comment data on the first live video that is issued by the other users followed by the user; (ii) comment data on other videos related to the first live video and issued by the other users followed by the user; and (iii) comment data on the first live video categorized by different styles;
  receiving a user selection of a first comment content package from the plurality of comment content packages;
  transmitting the first comment content package to the user terminal for presentation of the comment content on the user terminal while the first live video is displayed on the user terminal in real time.

8. The video presentation method according to claim 7, further comprising:
  wherein the user identifier is used for identifying the user who initiated the first comment presenting request message; and
  the generating the first comment content package comprises:
    obtaining information followed by the user according to the user identifier, and
    selecting the comment content related to the first video corresponding to the first video identifier and issued from the time point indicated by the first video playing time stamp according to the information followed by the user, into the first comment content package.

9. The video presentation method according to claim 7, further comprising: receiving and storing a second comment content package from other users transmitted from one or more other user terminals, and wherein the comment content used for generating the first comment content package is included in the second comment content package.

10. The video presentation method according to claim 9, further comprising:
  generating a comment package comprising comment content from the other users according to the second comment content package and storing the comment package;
  obtaining the information followed by the user according to the user identifier, and generating comment content issued by the other users whom the user has subscribed to follow according to the information followed by the user and the comment content in the comment package;
  determining, from the followed comment content, first comment content related to the first video corresponding to the first video identifier; and
  including, from the first comment content, comment content which is issued from the time point indicated by the first video playing time stamp into the first comment content package.

* * * * *